United States Patent [19]

Glachet

[11] Patent Number: 5,062,761

[45] Date of Patent: Nov. 5, 1991

[54] TELESCOPIC MANIPULATION ARM

[75] Inventor: Charles Glachet, Vendome, France

[73] Assignee: Euritech, Vendome, France

[21] Appl. No.: 490,602

[22] PCT Filed: Sep. 29, 1988

[86] PCT No.: PCT/FR88/00480

§ 371 Date: Mar. 12, 1990

§ 102(e) Date: Mar. 12, 1990

[87] PCT Pub. No.: WO89/02809

PCT Pub. Date: Apr. 6, 1989

[30] Foreign Application Priority Data

Sep. 30, 1987 [FR] France .................................. 87 13517

[51] Int. Cl.$^5$ ............................................... B25J 3/00
[52] U.S. Cl. .......................................... 414/729; 414/4;
901/25; 74/413
[58] Field of Search ................... 414/1, 3, 4, 718, 729,
414/730; 901/8, 25, 26; 74/413, 421 R, 421 A

[56] References Cited

U.S. PATENT DOCUMENTS

| | | | |
|---|---|---|---|
| 1,773,288 | 8/1930 | Valletta | 74/413 |
| 2,959,301 | 11/1960 | Willsea | |
| 3,108,498 | 10/1963 | James et al. | 901/25 X |
| 3,219,200 | 11/1965 | Ainsworth | 414/4 |
| 3,315,542 | 4/1967 | Fortin et al. | 414/1 X |
| 3,601,260 | 8/1971 | Le Guennec | 414/4 |
| 3,817,403 | 6/1974 | Glachet et al. | 414/4 X |
| 4,062,455 | 12/1977 | Flatau | 414/4 X |
| 4,068,536 | 1/1978 | Stackhouse | 901/26 X |
| 4,409,888 | 10/1983 | Woyer | 901/25 X |
| 4,421,445 | 12/1983 | Bohme et al. | 414/4 |
| 4,431,366 | 2/1984 | Inaba et al. | 414/4 X |

FOREIGN PATENT DOCUMENTS 2402829 8/1974 Fed. Rep. of Germany .
2497138 7/1982 France .
2545406 11/1984 France .

Primary Examiner—Robert J. Spar
Assistant Examiner—William M. Hienz
Attorney, Agent, or Firm—Oblon, Spivak, McClelland, Maier & Neustadt

[57] ABSTRACT

A telescopic manipulation arm includes a module formed by two segments and a toggle joint. All movements of the toggle joint are transmitted across the module by identical mechanisms in such a way that the friction and inertia are the same for each movement. These mechanisms incorporate shafts positioned equidistantly of an axis in the lower segment and shafts positioned equidistantly of the axis in an upper segment. Shafts are provided for carrying identical pinions, which engage on identical toothed gears, and which are also engaged on substantially identical pinions rotatable with the shafts.

7 Claims, 4 Drawing Sheets

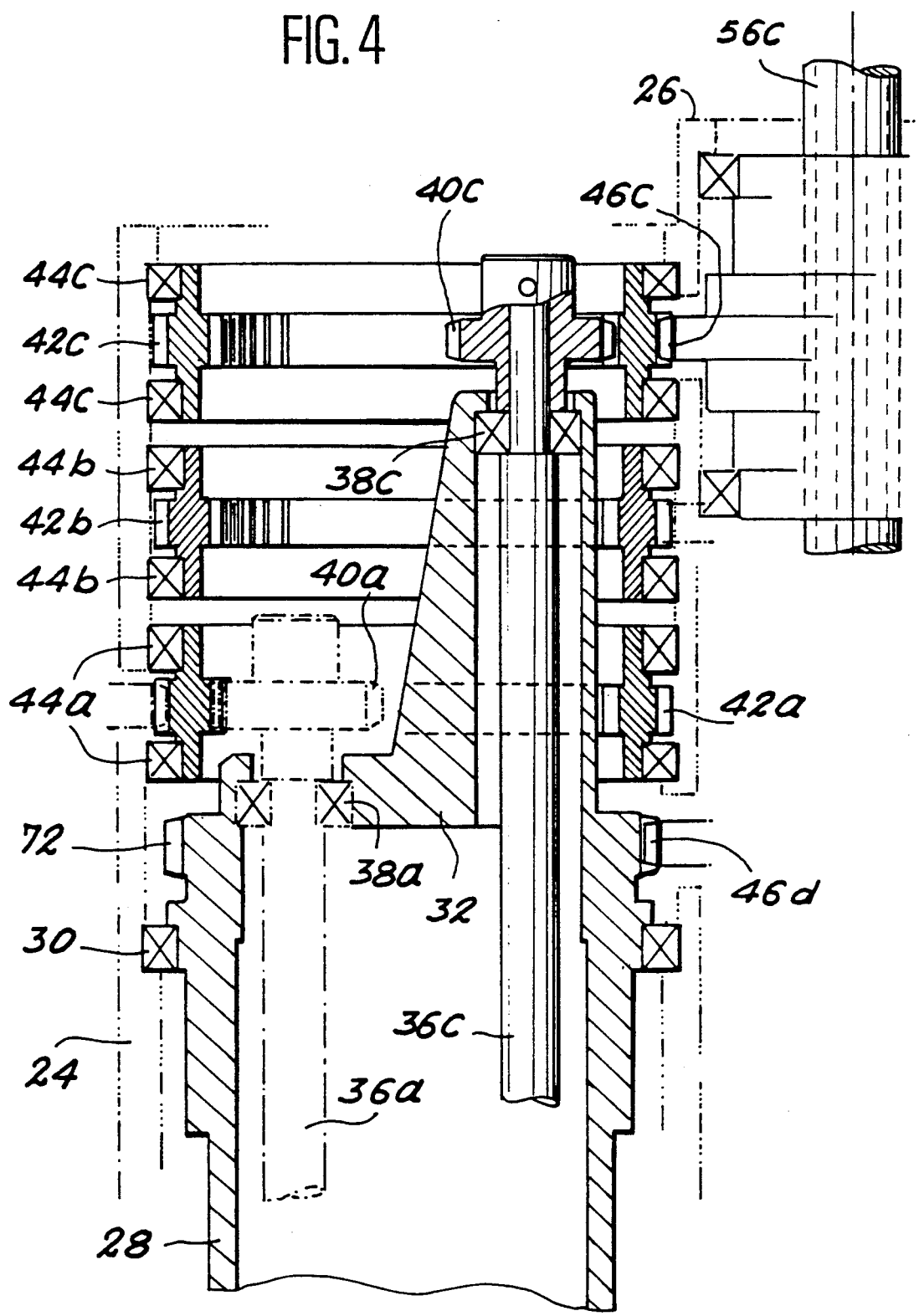

TELESCOPIC MANIPULATION ARM

BACKGROUND OF THE DISCLOSURE

1. Field of the Invention

The invention relates to a telescopic arm for carrying out or controlling a manipulation wherein an arm can be used on the master side or slave side of a master-slave telescopic telemanipulator and can also be used for forming the arm of a robot.

2. Discussion of the Background

FR-A-2 497 138 discloses a telescopic manipulator arm comprising at least two segments located on a common axis. The end segment comprises a tubular body carrying a toggle or knuckle joint at its end, as well as an intermediate part in which the tubular body can rotate. The segment adjacent to the end segment comprises a larger diameter tubular body in which slides the intermediate part.

As a function of whether it is a master arm or a slave arm, the toggle or knuckle joint carries a control handle or a tool, such as a gripper. The toggle joint enables the handle or tool to have two degrees of freedom respectively corresponding to an orientation movement (rotation of the handle or tool about its own axis) and an elevation movement (pivoting of the handle or tool about an axis orthogonal to its own axis and to the axis of the arm). A tool actuating movement (gripper tightening) is also transmitted across the toggle joint.

In FR-A-2 497 138, these three movements are transmitted across the end segment of the arm by three shafts arranged coaxially in accordance with the arm axis.

In the segment adjacent to the end segment, the transmission of the three movements of the toggle joint is ensured by square section shafts, whereof one is arranged along the axis of the arm. The two other shafts, as well as another square section shaft used for controlling the rotation of the tubular body of the end segment (azimuth movement) are arranged parallel to the axis of the arm and are equidistant thereof, in the annular space defined between the tubular bodies of the two segments.

The square section shaft arranged along the axis of the arm is rotatable with the central shaft of the lower segment as a result of four rollers mounted at the upper end of the central shaft, so as to be able to roll on the faces of the square section shaft parallel to the arm axis.

Each of the other square section shafts is integral in rotation with a pinion supported in a rotary manner by the intermediate part. To this end, a cylindrical sleeve joined to the pinion also carries four rollers able to roll on the faces of the corresponding shaft, which traverses said sleeve. All these pinions are identical and engage on identical toothed gears fixed to the upper end of two other concentric tubes of the end segment, as well as to the upper end of the tubular body of said same segment. Finally, the axial displacement of the intermediate part in the segment adjacent to the end segment is ensured by a chain and toothed gear system.

The arrangement of the movement transmission shafts in the telescopic manipulation arm described in FR-A-2 497 138 makes it possible to perform the azimuth movement without bringing about any twisting of the shafts.

However, the use of several concentric shafts in the internal tubular body leads to said shafts having different weights and to their being supported at the lower end by bearings having different diameters. The drive friction of the bearings and the inertia consequently differ between individual shafts, which leads to differences in the transmitted torques and in the distribution of the forces.

In practice, these differences lead to an asymmetry in the transmission of the orientation and elevation movements of the handle and tool, because these movements require the combined rotation of two of the concentric shafts. They also appear on carrying out an azimuth movement, because the latter requires the rotation of the other shafts.

SUMMARY OF THE INVENTION

The invention mainly relates to a telescopic manipulation arm having the same advantages as the arm described in FR-A-2 497 138, but in which the arrangement of the different shafts ensuring the transmission of the movements across the arm is such that the friction and inertia are completely identical for each of the controls.

According to the invention, this result is obtained by means of a telescopic manipulation arm incorporating an external tubular body and an internal tubular body arranged along a common axis and defining between them an annular space in which are mounted in parallel and equidistantly of said axis first rotary shafts supported in rotary manner by the external tubular body and second rotary shafts are supported in a rotary manner within the internal tubular body, the latter being supported in a rotary manner by an intermediate part able to slide in the external tubular body along said common axis, means being provided for controlling a translation of the intermediate part in the external tubular body, the intermediate part supporting in a rotary manner first identical pinions displaced along said axis, each first pinion being traversed by one of the first shafts and rotatable with the latter by a movement transmission means, and drive means by which one of the first pinions is integral in rotation with the internal tubular body and each of the other pinions is rotatable with a second rotary shaft, which is characterized in that the second rotary shafts are all mounted in parallel and equidistantly of said axis, said drive means incorporating second identical pinions fixed to each of the second shafts at each of the other first pinions, and identical toothed gears centered on said common axis and supported in a rotary manner by the intermediate member at each of the other first pinions, each of the toothed gears having an external tooth system engaged on one of the other first pinions and an internal tooth system engaged on one of the second pinions.

Preferably, the means for controlling a translation of the intermediate part incorporate one of the first rotary shafts, a rack fixed to the interior of the external tubular body parallel to said axis, a third pinion engaged on said rack and whose pin is carried by the intermediate member and two bevel gears or pinions, whereof one is integral with the pin of the third pinion and whereof the other is supported in a rotary manner by the intermediate member and rotatable with the first rotary shaft by another movement transmission means.

In a preferred embodiment of the invention, with the first shafts being cylindrical, each movement transmission means comprises a guide bush to which is fixed one of the first pinions, said bush being supported in a rotary manner by the intermediate member, whose axis coincides with one of the first shafts and carrying four series of cylindrical studs oriented radially towards the inside and distributed in accordance with four generatrixes of the bush at 90° from one another, said four series of studs being received in four longitudinal grooves at 90° of one another on the periphery of the first shaft, the width of the grooves being equal to the diameter of the guide rings mounted by means of a bearing on each of the studs.

The external tubular body can in particular be terminated by a plate at each of its ends, each of the first shafts having two ends supported in rotary manner in a said plates by means of at least one bearing. Each of the first shafts then preferably has a flexible portion in the vicinity of each of the plates.

In a comparable manner, the internal tubular body is terminated by a plate at each of its ends, each of the second shafts having two ends supported in a rotary manner in these plates via at least one bearing and carrying second pinions beyond one of said plates located permanently within the external tubular body.

According to another aspect of the invention, the intermediate member has a tubular portion surrounding the internal tubular body and supporting the latter by bearings at each of its ends and a larger diameter portion supporting the first pinions.

BRIEF DESCRIPTION OF THE DRAWINGS

The invention is described in greater detail hereinafter relative to non-limitative embodiments and the attached drawings, which show:

FIG. 4 shows a larger scale sectional view of part of the arm of FIG. 2.

DESCRIPTION OF THE PREFERRED EMBODIMENT

Figure 1:
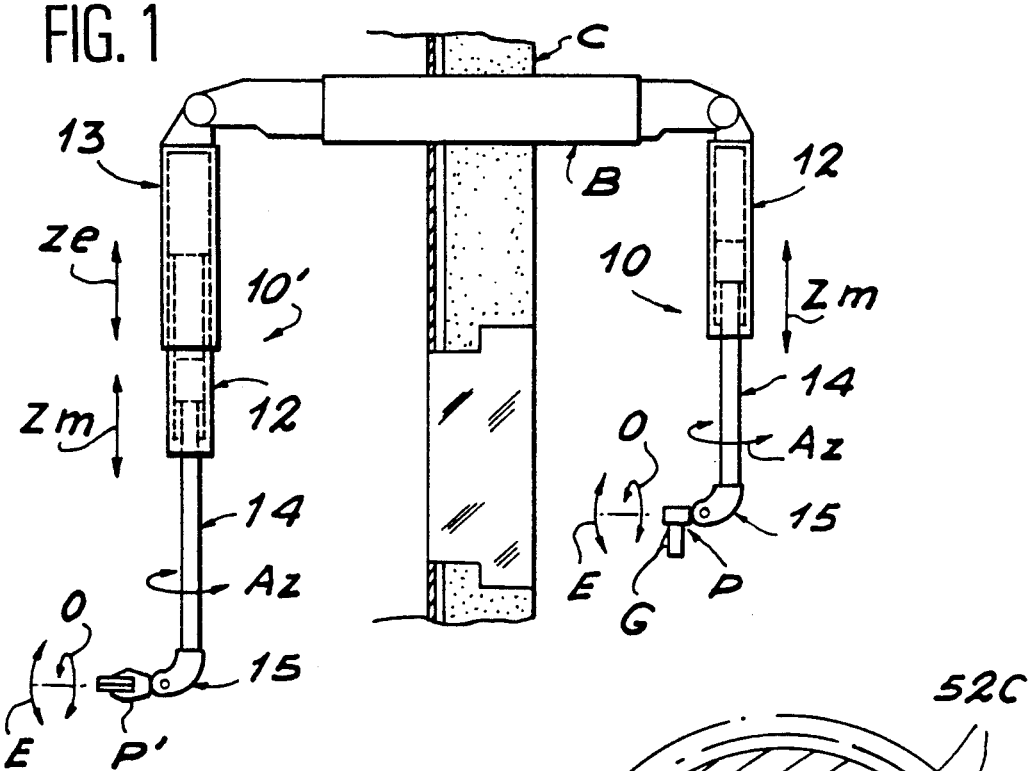
FIG. 1 shows diagrammatically a telescopic telemanipulator, whose master and slave arms are constructed according to the invention.

FIG. 1 diagrammatically shows a master-slave telemanipulator, whose telescopic arms are advantageously constructed according to the invention. In a known manner, said telemanipulator comprises a master arm 10 and a slave arm 10' articulated by parallel pins, called shoulder pins, to a passage or crossing block B, whose axis is perpendicular to the shoulder pins. Block B tightly traverses a partition C of a confinement cell in which the slave arm 10' is located. The fitting of block B in partition C enables rotation of the block about its own axis.

Arms 10 and 10' are telescopic. The master arm 10 comprises two segments 12 and 14, respectively called the upper segment and lower segment, which are able to slide in one another along the arm axis. More specifically, the upper segment 12 is articulated at one of its ends to the passage block B and the lower segment 14 slides in the upper segment and carries a knuckle or toggle joint 15 at its opposite end. The assembly constituted by segments 12 and 14 and by the toggle joint 15 constitutes a module, which reoccurs in identical form in slave arm 10'.

As will be shown in greater detail hereinafter, to the elongation movement Zm permitted by the sliding of segment 14 in segment 12 is added a rotary movement about the arm of that part of segment 14 carrying the toggle joint. This latter movement, called an azimuth movement, is designated Az in FIG. 1.

A control handle P is articulated to toggle joint 15 of master arm 10. This articulation is such that the handle can rotate about its own axis (orientation movement 0) and about an axis orthogonal to the latter, as well as to the axis of the arm (elevation movement E). The handle P also carries a trigger G for controlling the tightening of the gripper carried by the slave arm 10'.

As stated hereinbefore, the slave arm comprises a module formed by an upper segment 12, a lower segment 14 and a toggle joint 15, said module being identical to that of the master arm. As for the master arm, one end of the upper segment 12 can be directly articulated to the passage block B.

However, in the embodiment shown in FIG. 1, the slave arm 10' comprises a third segment 13 interposed between segment 12 and the passage block. More specifically, the upper segment 12 slides along the axis of the arm in the third segment 13, whose opposite end is articulated to the passage block B. This arrangement makes it possible to add to the elongation possibility Zm of the slave arm controlled by the master arm supplementary and electrically controlled elongation movement Ze. This known characteristic makes it possible to have access to certain areas of the cell without changing the position of the operator.

A tool, here constituted by a gripper P', is articulated to the toggle joint 15 of slave arm 10'. The module constituted by segments 12 and 14 and by the toggle joint 15 is identical to that of the master arm 10, the toggle joint 15 again having an elongation movement Zm and azimuth movement Az and the gripper P' orientation movement 0 and elevation movement E, as well as a tightening or clamping movement.

In addition, the telemanipulator is equipped with means within the arm and passage block making it possible to transmit to the slave arm 10' and the gripper P' all the movements imparted to the master arm 10 and to the control handle P by the operator.

The transmission of movements through the passage block B takes place in a conventional manner, e.g. using rotary shafts equipped with bevel gears at their ends.

The structure of the assembly formed by upper and lower segments 12, 14 respectively will now be described in detail with reference to FIGS. 2 to 6 in the case of the slave arm 10'. As stated, the structure of the segments constituting the master arm is identical.

Figure 2:
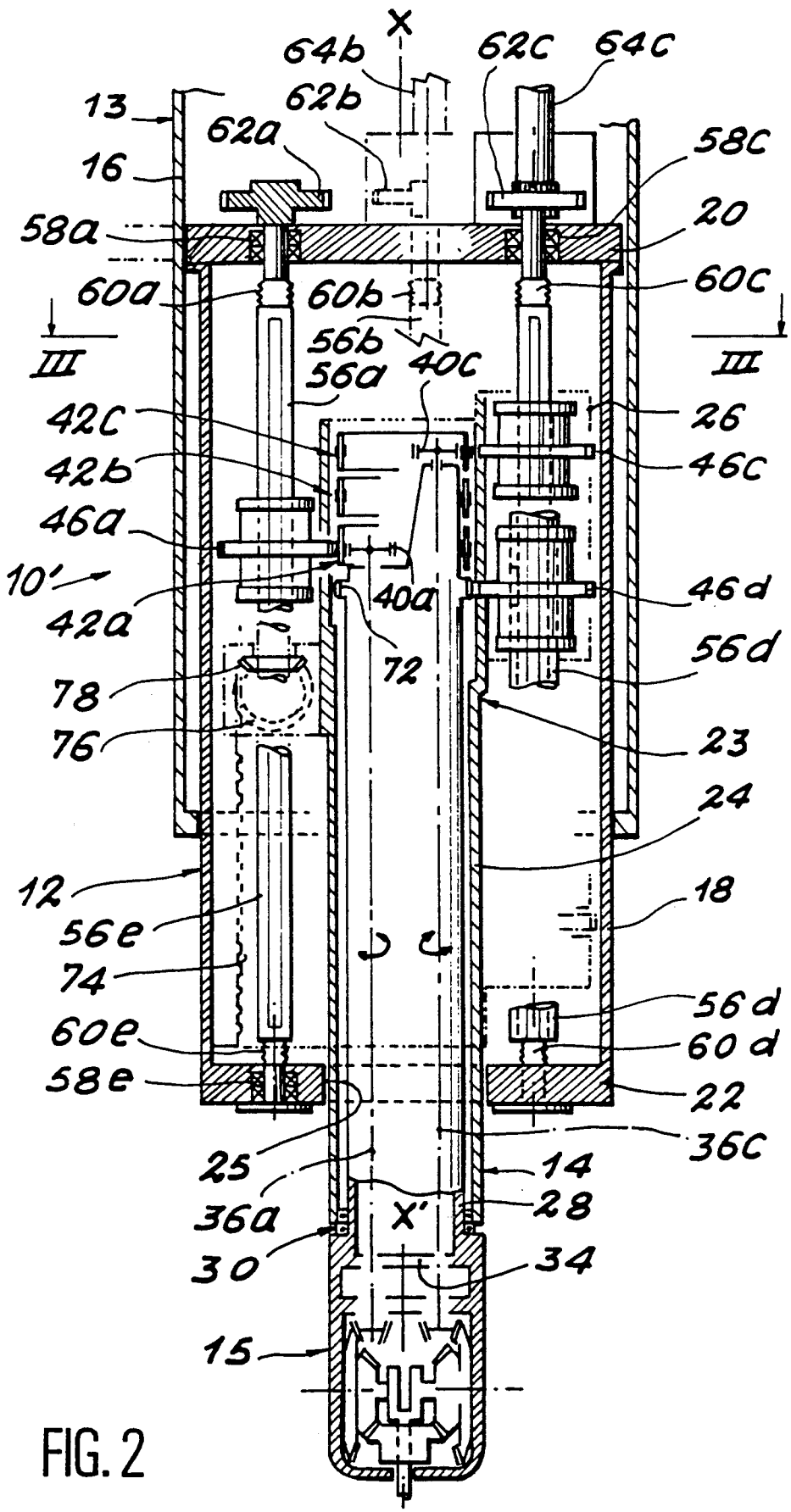
FIG. 2 shows a longitudinal sectional view taken along line II—II of FIG. 3 diagrammatically showing a telescopic arm according to the invention.

FIG. 2 shows the third segment 13 of the slave arm, the upper segment 12, the lower segment 14 and the toggle joint 15. The three segments are located along a common axis X—X' constituting the axis of the arm. Segment 13 is mainly formed by a tube 16 centred on axis X—X'.

The upper segment 12 comprises a tubular body 18, called the external tubular body and which is also centered on axis X—X'. Tubular body 18 is sealed at its upper and lower ends by radial plates 20, 22. Tube 18 is mounted in a sliding manner within the tube 16 of segment 13.

Lower segment 14 has an intermediate part 23 incorporating a tubular portion 24 positioned coaxially to the interior of tubular body 18 and traversing a circular opening 25 made in plate 22. The intermediate part 23 also has a larger diameter portion 26, whose contour is shown diagrammatically in mixed line form in FIG. 2. Portion 26 is fixed to the upper end of the tubular portion 24 and is mounted in a sliding manner in tubular body 18.

The lower segments 14 of the slave and master arms comprise an internal tubular body 28 arranged along the axis X—X' and within the tubular portion 24. The tubular body 28 is supported in a rotary manner at each of its ends by bearings 30. The ends of the internal tubular body 28 are respectively sealed by an upper radial plate 32 (FIG. 4) and by a lower radial plate 34 (FIG. 2).

Three shafts 36a, 36b and 36c are supported in rotary manner in a the internal tubular body 28. For this purpose, their ends are received in bearings 38a, 38b, 38c mounted in radial plates 32 and 34. In FIGS. 2 and 4 it is only possible to see the shafts 36a and 36c, as well as the bearings supporting them. The shafts 36a, 36b and 36c are cylindrical shafts having the same diameter, whose axes are located parallel to and equidistant of axis X—X'.

As shown in FIG. 4, at their ends located above plate 32, each of the shafts 36a, 36b and 36c carries a pinion 40a, 40b, 40c. The three pinions 40a, 40b, 40c are identical, i.e. they have the same diameter and the same number of teeth. However, the length of shafts 36a, 36b, 36c is different, so that the three pinions 40a, 40b and 40c are located in three different planes perpendicular to axis X—X', the distance separating two adjacent planes being the same.

Each of the pinions 40a, 40b, 40c is engaged on the internal tooth system of a toothed gear 42a, 42b, 42c supported in a rotary manner by intermediate part 23. Each of the toothed gears is mounted in part 23 by means of two bearings 44a, 44b, 44c respectively. The three toothed gears 42a, 42b, 42c are arranged coaxially and in a superimposed manner along axis X—X' and are all identical, i.e. the dimensions and number of teeth of the internal and external tooth systems thereof are the same.

The external tooth system of each of the toothed gears 42a, 42b, 42c is engaged on a pinion 46a, 46b, 46c (FIG. 3) supported in rotary manner by part 23. The axes of pinions 46a, 46b, 46c are parallel and equidistant of axis X—X', in such a way that these pinions are distributed in a ring-like manner in the annular space formed between the tubular body 18 and the tubular portion 24. Pinions 46a, 46b and 46c are all identical, i.e. the diameter of their tooth systems and the number of teeth are the same.

Figure 5:
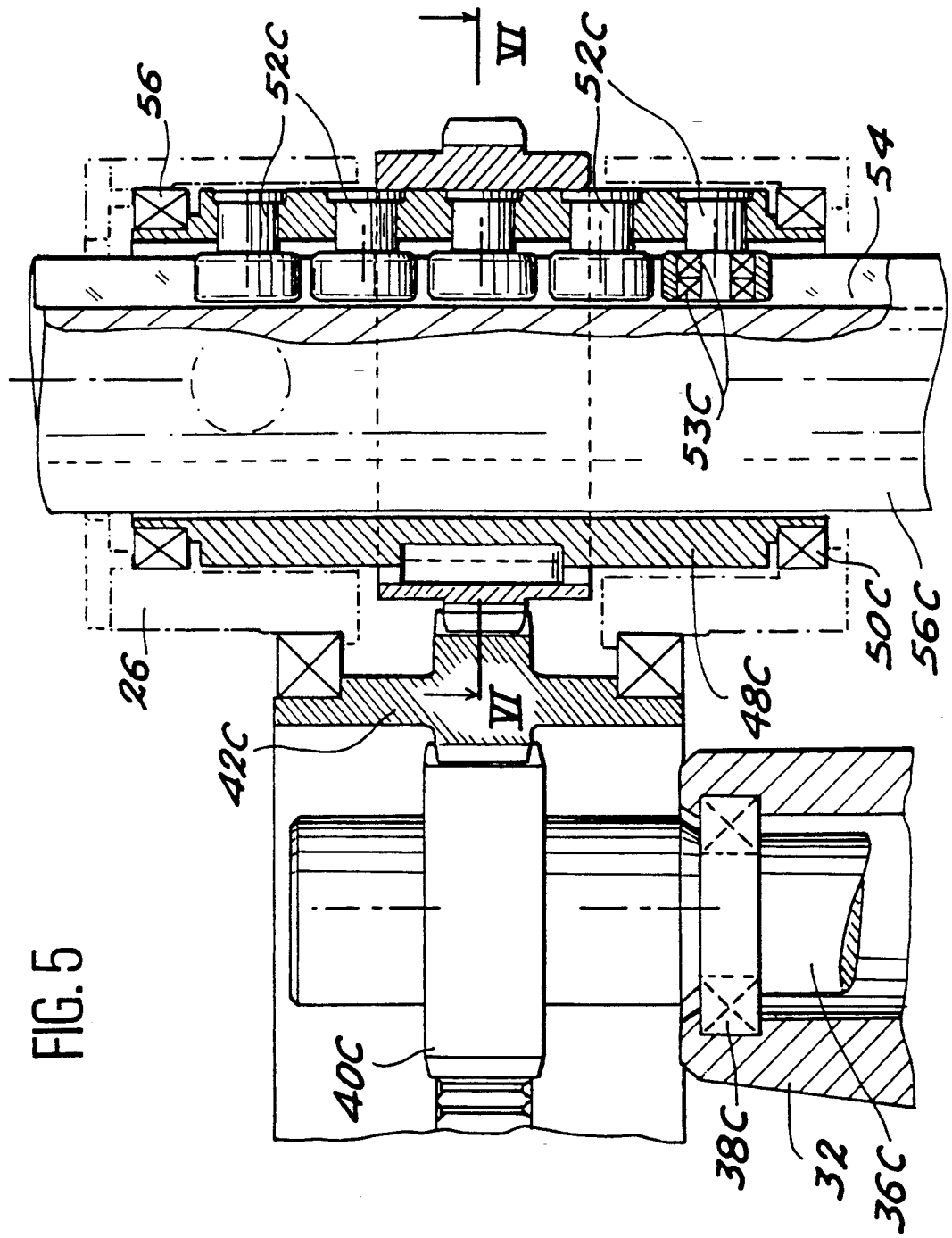
FIG. 5 shows a larger scale longitudinal sectional view of one of the guide bushes ensuring the transmission of a rotary movement between each of the shafts disposed in the annular space formed between the two tubular bodies of the arms and the corresponding pinion supported by the intermediate member.

FIG. 5 shows in greater detail the fitting of pinion 46c in portion 26 of part 23. The following description also applies to the fitting of pinions 46a, 46b in portion 26. Pinion 46c is fixed by a key to a guide bush 48c, whose ends are mounted in a rotary manner in portion 26 by two bearings 50c. This bush 48c carries on its internal face four series of identical cylindrical studs 52c (FIG. 6) oriented radially towards the inside and distributed in accordance with four generatrixes of the bush arranged at 90° of one another. These four series of studs 52c carry, via bearings 53c, guide rings 55c, which are received in four longitudinal grooves 54c positioned at substantially a 90° angle with respect to one another on the peripheral surface of a cylindrical shaft 56c supported in rotary manner by the upper segment 12 of the arm. The width of the grooves 54c is approximately equal to the diameter of each of the rings 55c.

More specifically (FIG. 2), the ends of the shaft 56c are mounted in plates 20 and 22 of segment 12 by bearings 58c. Preferably, shaft 56c has two flexible portions 60c in the immediate vicinity of its ends received in the bearings 58c, in order to give the assembly an isostatic character.

As a result of the arrangement described hereinbefore, it is clear that a rotary movement of shaft 56c about its axis is transmitted with minimum friction to pinion 46c. A device identical to that described hereinbefore with reference to FIGS. 5 and 6 makes it possible to rotate each of the pinions 46a, 46b by means of two other shafts 56a and 56b mounted in a rotary manner in the intermediate segment 12 by bearings 58a, 58b received in plates 20, 22.

Shafts 56a, 56b, 56c are arranged parallel to one another and to the axis X—X' equidistantly thereof and essentially in the center of the annular space formed between tubular body 18 and tubular portion 24. Like shaft 56c, shafts 56a and 56b have two flexible portions 60a, 60b in the vicinity of their ends received in the bearings 58a, 58b. In addition, the three shafts are identical, i.e. they have the same external diameter.

At their end located above plate 20, each of the shafts 56a, 56b and 56c carries a pinion 62a, 62b and 62c. The three pinions 62a, 62b and 62c are identical, i.e. they have the same diameter and same number of teeth.

In the case of the slave arm having a third segment 13, each of the pinions 62a, 62b and 62c is engaged on another pinion supported (not shown) in rotary manner by plate 20. Said other pinion is traversed by a shaft 64a, 64b and 64c supported in rotary manner by segment 13 and rendered integral in rotation with said other pinion by a mechanism comparable to that described hereinbefore with reference to FIGS. 5 and 6.

The axes of shafts 64a, 64b and 64c are parallel to and equidistant of axis X—X' and are angularly displaced with respect to the axes of shafts 56a, 56b and 56c. They are all identical, as are the pinions which drive them. At their upper end, shafts 64a, 64b and 64c cooperate by bevel gears or pinions (each not shown) with the rotary shafts located in the passage block B.

In the case (not shown) of a slave arm completely identical to the master arm, i.e. not having the third segment 13, such bevel gears are placed directly between adjacent ends of the shafts 56a, 56b and 56c and rotary shafts located in the passage block B.

The three movement controls described hereinbefore with the references followed respectively by a, b and c are used for controlling the orientation movement 0 and elevation movement E of the gripper P', as well as the gripper tightening movement. To this end, the toggle joint 15 contains in a conventional manner a system of gears arranged in such a way that rotation of shaft 36b has the effect of controlling the gripper tightening movement, rotation in the same direction of shafts 36a, 36c has the effect of controlling the orientation movement 0 and rotation in the opposite direction of shafts 36a, 36c has the effect of controlling the elevation movement B. In order to control the rotary movement of the internal tubular body 28 within the tubular portion 24, i.e. the azimuth movement Az, use is made of an arrangement comparable to that described hereinbefore.

More specifically and as illustrated by FIGS. 2 and 4, the internal tubular body 28 carries at its upper end and on its outer face a toothed gear 72 located below the toothed gears 42a, 42b and 42c. The diameter of toothed gear 72 is slightly smaller or equal to the external diameter of toothed gears 42a to 42c. A pinion 46d supported in a rotary manner by portion 26 of part 23 meshes on the toothed gear 72. The axis of said pinion 46d is parallel to axis X—X' and is located at the same distance from said axis as the axes of pinions 46a to 46c. Pinion 46d is traversed along its axis by a cylindrical shaft 56d parallel to axis X—X' of the arm and at the same distance from said axis as shafts 56a to 56c. A mechanism identical to that described hereinbefore with reference to FIGS. 5 and 6 transmits to the pinion 46d any rotation of shaft 56d, whilst permitting the relative displacement thereof along axis X—X' necessitated by the movement Zm.

Like shafts 56a to 56c, shaft 56d is supported at its ends by bearings mounted in plates 20 and 22. It also has flexible portions 60d in the vicinity of its ends mounted in plates 20 and 22. The rotation of shaft 56d is brought about in the same way as for shafts 56a to 56c and will not be described again.

Finally, in order to ensure the displacement along axis X—X' of the lower segment 14 in the upper segment 12 (elongation movement Zm), the tubular body 18 supports on its internal face and along a generatrix a rack 74. A pinion 76, whose axis is orthogonal to axis X—X' and supported by portion 26 of part 23, meshes on rack 74. Pinion 76 is integral with a not shown bevel gear or pinion, which meshes on a second bevel gear or pinion 78, whose axis is parallel to axis X—X' and which is located in the annular space formed between the external tubular body 18 and the tubular portion 24.

Figure 6:
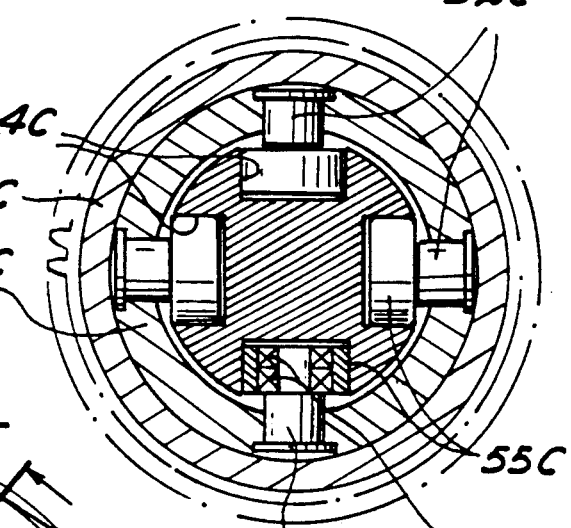
FIG. 6 shows a sectional view along line VI—VI of FIG. 5.
Figure 3:
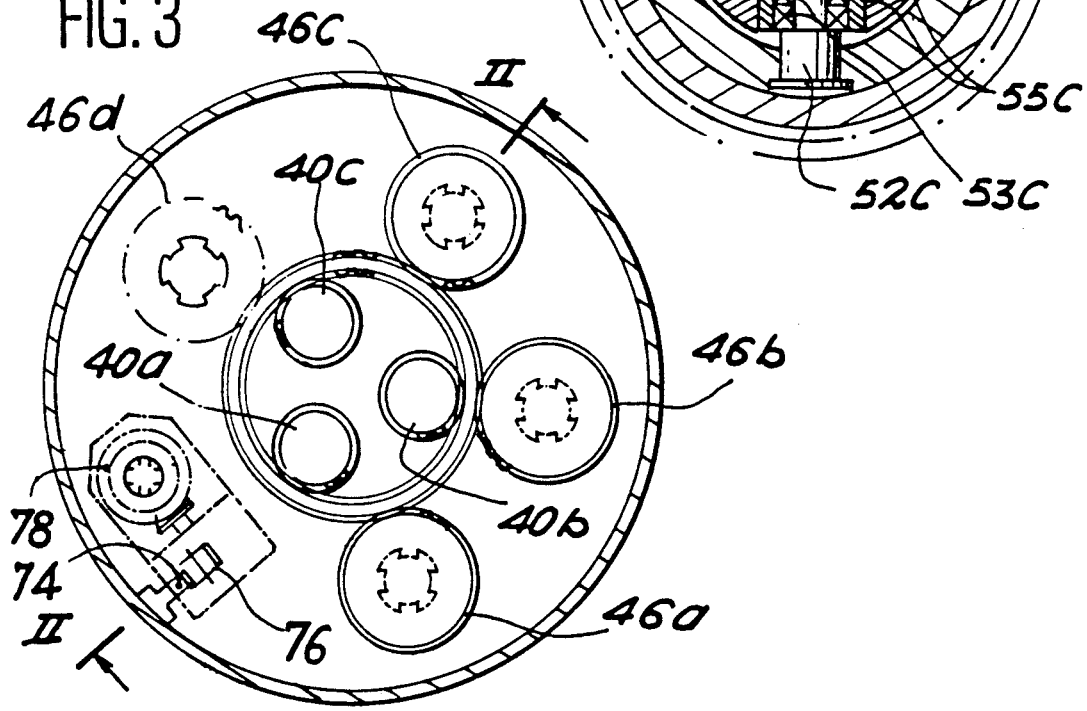
FIG. 3 shows a sectional view taken along line III—III of FIG. 2.

Pinion 78 is traversed along its axis by a shaft 56e, whose axis is parallel to axis X—X' and is located at the same distance from the latter as shafts 56a to 56d in the annular space formed between tube 18 and tubular portion 24. A mechanism identical to that described hereinbefore with reference to FIGS. 5 and 6 is interposed between pinion 78 and shaft 56e, so as to make said two parts rotatable together, whilst allowing their relative displacement along axis X—X'.

The supporting of shaft 56e by segment 12 of the arm is ensured by bearings 58e mounted in plates 20, 22 and shaft 56e comprises flexible portions 60e in the vicinity of its ends and received in bearings. Moreover, the rotation of shaft 56e from arm segment 13 is brought about in the same way as for shafts 56a to 56d.

As a result of the arrangement described hereinbefore, an azimuth movement leads to no twisting of the shafts controlling the other movements.

Moreover, in view of the fact that the dimensions and arrangement of the different parts controlling the orientation movement 0, elevation movement E and tightening are completely symmetrical with respect to the axis X—X', friction and inertia are the same no matter which movement is controlled. Consequently, the control of the elevation and orientation movements necessitating the actuation of two mechanisms whose references carry the letters a and c in the description, takes place without there being any parasitic movement, such as an azimuth movement.

Another advantage of the telescopic manipulation arm described hereinbefore is that the particular arrangement of the movement transmission members makes it possible to optionally ensure a tight sliding of segment 12 in segment 13 and a tight sliding of segment 14 in segment 12. For this purpose it is merely necessary to place an annular gasket at the lower end of the tubular body 16 and within plate 22. It is therefore possible to eliminate the sealing sleeve which frequently surrounds the slave arm and also to work under special atmospheres and in particular in water.

Moreover, the assembly constituted by the upper segment 12, the lower segment 14 and the toggle joint 15 constitutes a module which, without undergoing any change, can be used either on the slave slide or on the master side of a telemanipulator. This module can be used as a robot arm, its control then being directly ensured by motors driving shafts, each controlling movements, said motors being remotely controlled with the aid of a console.

Finally, like all the manipulation arms whose control is ensured by rotary shafts, the arm according to the invention is particularly reliable and does not require the frequent interventions needed in the case of cable or belt-based means.

Obviously, numerous modifications and variations of the present invention are possible in light of the above teachings. It is therefore to be understood that within the scope of the appended claims, the invention may be practiced otherwise than as specifically described herein.

I claim:

1. A telescopic manipulation arm, which comprises:
    an external tubular body and an internal tubular body arranged along a common axis and defining therebetween an annular space in which are mounted in parallel and equidistantly of said axis a plurality of first rotary shafts supported in a rotary manner by the external tubular body
    a plurality of second rotary shafts supported in a rotary manner within the internal tubular body, the latter being supported in a rotary manner by an intermediate part so as to be slidable in the external tubular body along said common axis,
    means for controlling translation of the intermediate part in the external tubular body, the intermediate part supporting in a rotary manner first identical pinions, each first pinion being traversed by one of the first shafts and being rotatable with the latter by a first transmission means;
    drive means by which one of the first pinions is rotatable with the internal tubular body wherein each of the remaining first pinions is rotatable with said second rotary shafts;
    the second rotary shafts all each mounted in parallel and equidistantly of said axis, said drive means incorporating second substantially identical pinions fixed to each of the second shafts, and substantially identical toothed gears centered on said common axis and supported in a rotary manner by the intermediate member, each of the toothed gears having an external tooth system engaged on one of the remaining first pinions and an internal tooth system engaged with one of the second pinions.

2. A manipulation arm according to claim 1, wherein the means for controlling translation of the intermediate part includes one of the first rotary shafts, a rack fixed to the interior of the external tubular body parallel to said axis, a third pinion engaged on said rack and carried by the intermediate member, wherein said third pinion is rotatable with said one first rotary shaft by a second transmission means.

3. A manipulation arm according to claim 1, wherein the first shafts are cylindrical and the first transmission means comprises a guide bush to which is fixed one of the first pinions, said bush being supported in a rotary manner by the intermediate member, the axis of the guide bush coinciding with one of the first shafts, the guide bush carrying four series of cylindrical studs oriented radially inwardly and positioned at an angle of substantially 90° with respect to one another, said four series of studs being received in four longitudinal grooves positioned at an angle of substantially 90° with respect to one another on the periphery of at least one of the first shafts, the width of the grooves being substantially equal to the diameter of a plurality of guide rings mounted by means of a bearing on the studs.

4. A manipulation arm according to claim 1, wherein the external tubular body includes a plate member located at opposite ends thereof, each of the first shafts having two ends respectively supported in rotary manner in each of said plate members by means of at least one bearing.

5. A manipulation arm according to claim 4, wherein each of the first shafts has a flexible portion in the vicinity of each of the plate members.

6. A manipulation arm according to claim 1, wherein the internal tubular body includes a plate member located at substantially opposite ends thereof, each of the second shafts having opposite ends respectively supported in a rotary manner in said plate members by bearing means and carrying the second pinions beyond one of said plate members, located within the external tubular body.

7. A manipulation arm according to claim 1, wherein the intermediate member comprises a tubular portion surrounding the internal tubular body and bearing means for supporting the latter at opposite ends thereof, and a larger diameter portion supporting the first pinions.

* * * * *